United States Patent
Yoshida et al.

(10) Patent No.: US 8,311,158 B2
(45) Date of Patent: Nov. 13, 2012

(54) RECEIVER CIRCUIT, RECEPTION METHOD, AND COMMUNICATION SYSTEM

(75) Inventors: Hiroshi Yoshida, Kanagawa (JP); Kazumi Sato, Kanagawa (JP); Takehiko Toyoda, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 519 days.

(21) Appl. No.: 12/683,039

(22) Filed: Jan. 6, 2010

(65) Prior Publication Data

US 2010/0189205 A1 Jul. 29, 2010

(30) Foreign Application Priority Data

Jan. 28, 2009 (JP) ................. 2009-017256

(51) Int. Cl.
*H03D 3/18* (2006.01)
(52) U.S. Cl. ....... 375/328; 375/349; 375/350; 455/63.1; 455/67.11; 455/574; 455/226.1
(58) Field of Classification Search .......... 375/324, 375/328, 340, 346, 349, 350; 455/13.4, 501, 455/63.1, 67.11, 574, 134, 226.1–226.4; 327/50, 54, 56, 57
See application file for complete search history.

(56) References Cited

U.S. PATENT DOCUMENTS

| | | | | |
|---|---|---|---|---|
| 6,003,051 A * | 12/1999 | Okazaki | ............................ | 708/3 |
| 7,209,528 B2 * | 4/2007 | Prater | ............................ | 375/345 |
| 7,251,284 B2 * | 7/2007 | Menkhoff et al. | ............ | 375/261 |
| 8,208,590 B2 * | 6/2012 | Okada et al. | .................. | 375/350 |
| 2009/0280765 A1 * | 11/2009 | Rofougaran et al. | ...... | 455/226.2 |

FOREIGN PATENT DOCUMENTS

| | | |
|---|---|---|
| JP | 09-275426 | 10/1997 |
| JP | 2000-269785 | 9/2000 |
| JP | 2001-016121 | 1/2001 |
| JP | 2001-094618 | 4/2001 |
| JP | 2006-173711 | 6/2006 |
| JP | 2006-261760 | 9/2006 |

OTHER PUBLICATIONS

Japanese Office Action for Japanese Application No. 2009-017256 mailed on Jan. 31, 2012.

* cited by examiner

*Primary Examiner* — Dac Ha
(74) *Attorney, Agent, or Firm* — Turocy & Watson, LLP

(57) ABSTRACT

A receiver circuit includes an LPF configured to remove an interference signal and/or a noise from a received signal, an ADC configured to digitize a signal output from the LPF, an FIR filter configured to further remove an interference signal and/or a noise from the signal output from the ADC and compensate imperfection in in-band characteristics caused in the LPF, a delay circuit configured to delay the signal output from the ADC by a predetermined time period, and a control circuit configured to control a destination of the signal output from the ADC, wherein the control circuit switches the destination of the signal output from the ADC to one of the FIR filter and the delay circuit according to a predetermined condition.

20 Claims, 4 Drawing Sheets

RECEIVER CIRCUIT, RECEPTION METHOD, AND COMMUNICATION SYSTEM

CROSS-REFERENCE TO RELATED APPLICATION

This application is based upon and claims the benefit of priority from the prior Japanese Patent Application 2009-17256 filed in Japan on Jan. 28, 2009; the entire contents of which are incorporated herein by reference.

BACKGROUND OF THE INVENTION

1. Field of the Invention

The present invention relates to a receiver circuit, a reception method, and a communication system. More particularly, the present invention relates to a receiver circuit, a reception method, and a communication system that compensates demodulation characteristics of an analog filter using a digital filter.

2. Description of Related Art

With recent enhancement of high-speed data transfer capability such as HSDPA, mobile communication terminal devices for wireless CDMA and the like are now required to improve modulation accuracy, that is, to limit modulation accuracy (Error Vector Magnitude, hereinafter referred to as EVM) of a reception section of a radio below several percent.

To improve EVM, receiver circuits that combine an analog filter and a digital filter have been proposed (see Japanese Patent Application Laid-Open Publication No. 2000-269785, for instance). The circuit described in the publication removes most part of an interference signal which has been taken in superimposed on a desired received signal or an interference signal far from a carrier with an analog filter, and removes remaining interference signal components with a digital filter. Thus, by using an analog filter and a digital filter in combination, an interference signal can be efficiently removed and a desired received signal can be retrieved.

When an analog filter and a digital filter are used in combination, the digital filter is often given a function of compensating imperfection in in-band characteristics caused in the analog filter, e.g., gain ripple or phase rotation due to group delay variation. Distribution of characteristics between an analog filter and a digital filter is defined when functional characteristics of the filters are designed in consideration of various conditions, such as a dynamic range of an A/D converter, EVM required for the radio, and input specifications of an interference signal.

However, because a digital filter responsible for not only removal of an interference signal but compensation of analog filter characteristics is composed of a finite impulse filter (hereinafter referred to as an FIR filter), the FIR filter has a longer tap length (i.e., a length of a tap coefficient) and/or a longer tap width (accuracy of a tap coefficient) than those of a typical digital filter (a root Nyquist filter). Since an FIR filter requires a larger hardware and consumes greater electric power as its tap length or width becomes greater, an FIR filter has a problem of hampering reduction of power consumption of a mobile communication terminal device.

BRIEF SUMMARY OF THE INVENTION

A receiver circuit according to an embodiment of the present invention includes: an analog filter configured to remove an interference signal and/or a noise from an analog received signal; an analog-to-digital converter configured to digitize a signal output from the analog filter; a digital filter configured to further remove the interference signal and/or the noise from a signal output from the analog-to-digital converter and compensate imperfection in in-band characteristics caused in the analog filter; a delay circuit configured to delay the signal output from the analog-to-digital converter by a predetermined time period; and a control circuit configured to control a destination of the signal output from the analog-to-digital converter, wherein the control circuit switches the destination of the signal output from the analog-to-digital converter to one of the digital filter and the delay circuit according to a predetermined condition.

DETAILED DESCRIPTION OF THE INVENTION

Hereinafter, embodiments of the present invention will be described with reference to drawings.

First Embodiment

Figure 1:
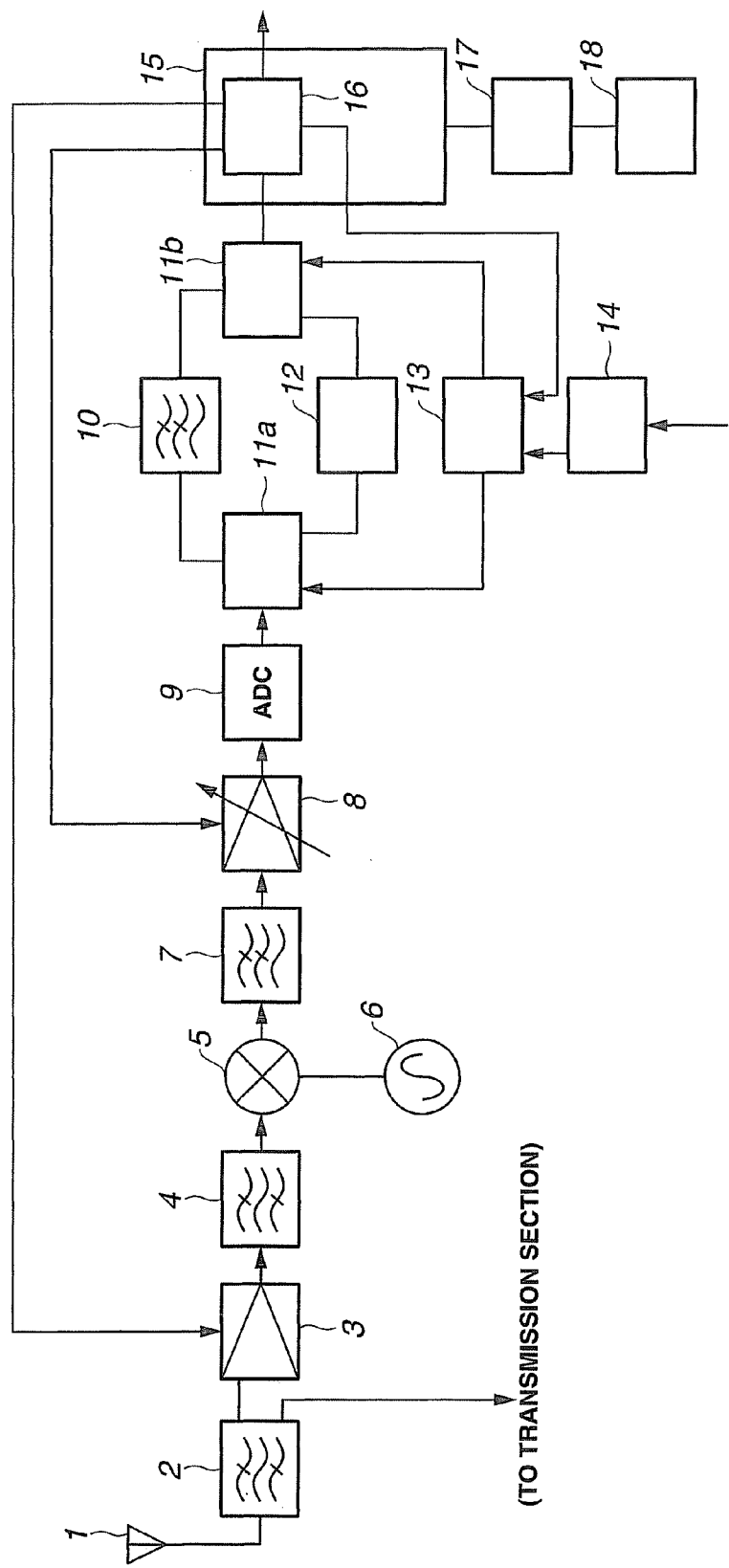
FIG. 1 is a schematic block diagram illustrating an example of configuration of a receiver circuit according to a first embodiment of the present invention.

First, referring to FIG. 1, configuration of a receiver circuit according to a first embodiment of the invention is described. FIG. 1 is a schematic block diagram illustrating an example of configuration of the receiver circuit according to the first embodiment of the invention. FIG. 1 shows a mobile communication terminal device (mainly a reception section) that includes the receiver circuit according to the first embodiment of the invention.

As shown in FIG. 1, the mobile communication terminal device including the receiver circuit according to the first embodiment of the invention receives a signal transmitted from another mobile communication terminal device on an antenna 1. The received signal is output to a low-noise amplifier (LNA) 3 via a transmission/reception switching section 2 which is composed of a switch and a duplexer. The transmission/reception switching section 2 is also connected with a transmission section not shown besides the LNA 3, and selects whether to connect the antenna 1 with the transmission section or the reception section including the LNA 3. That is to say, to transmit a signal from the mobile communication terminal device to other devices, the antenna 1 is connected with the transmission section not shown and a signal input from the transmission section is output to the antenna 1.

The LNA 3 amplifies a received signal input from the transmission/reception switching section 2 with low noise and outputs the amplified received signal to a bandpass filter (BPF) 4. The received signal input to the BPF 4 is subjected to extraction of a desired RF band and output to a quadrature demodulator (QDEM) 5.

The QDEM 5 is connected with a synthesizer (or an oscillator) 6 and converts the received RF signal input from the BPF 4 into a baseband signal. The received signal converted to the baseband signal is output to a low-pass filter (LPF) 7, which is an analog filter, where mainly noise and/or high-frequency bands which are interference signals are removed. The received signal output from the LPF 7 is input to a variable gain amplifier (VGA) 8, in which gain is adjusted to a desired value. The received signal after gain adjustment is output to an analog-to-digital converter (ADC) 9 and digitized therein to be output to a switch 11a.

The switch 11a is connected with an FIR filter 10 which is a digital filter and a delay circuit 12. The switch 11a is composed as a 1-input-2-output demultiplexer, for example, and the received signal input from the ADC 9 is output to either the FIR filter 10 or the delay circuit 12 via the switch 11a. Switching of the switch 11a is made in accordance with a switching control signal input from a switch control section 13. Switching control on the switch 11a by the switch control section 13 will be described in greater detail later.

Figure 2:
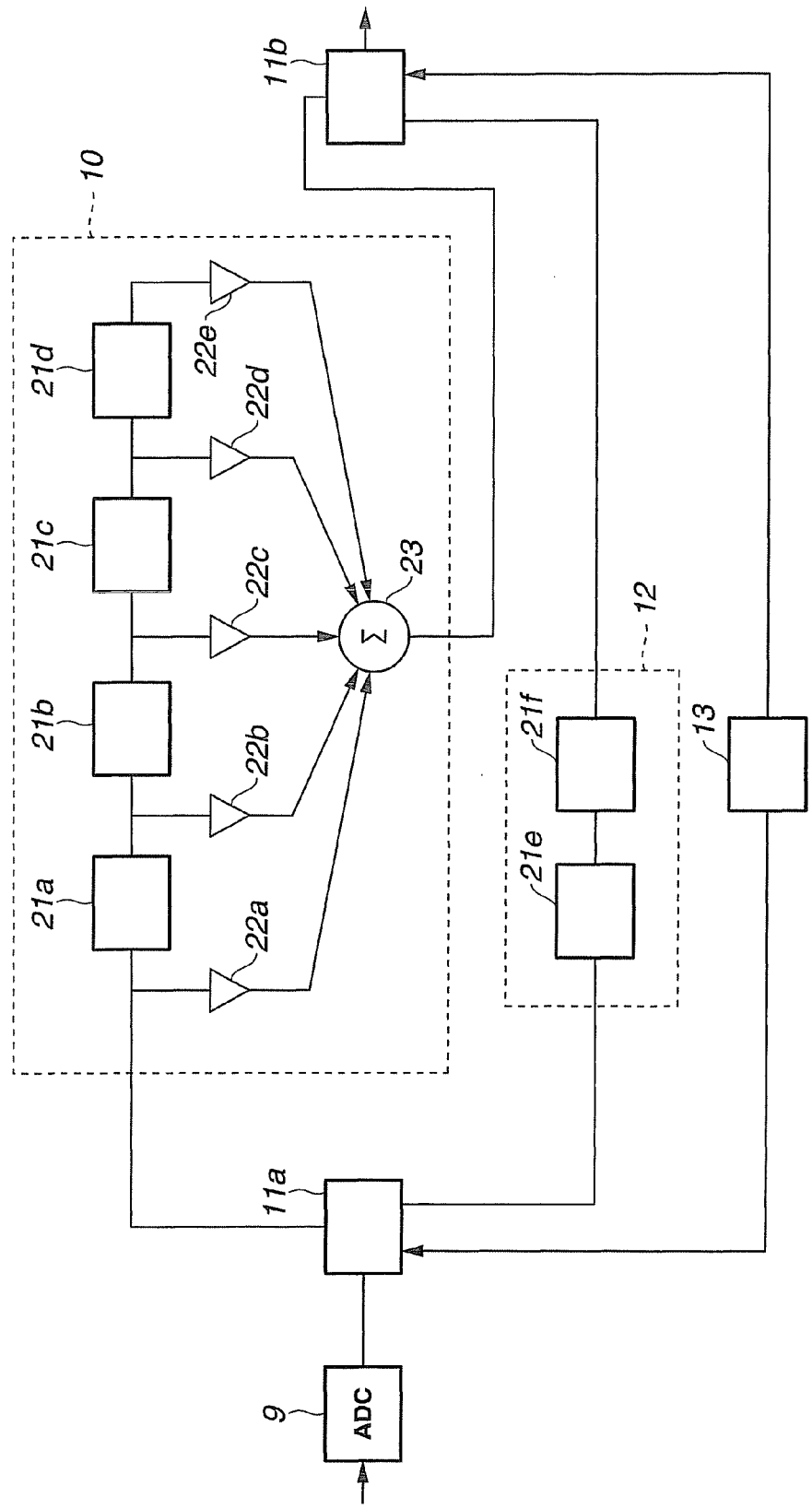
FIG. 2 is a circuit diagram illustrating an example of circuit configuration of an FIR filter 10 and a delay circuit 12.

An example of circuit configuration of the FIR filter 10 is shown in FIG. 2. FIG. 2 is a circuit diagram illustrating an example of circuit configuration of the FIR filter 10 and the delay circuit 12. As shown in FIG. 2, the FIR filter 10 is composed of four flip-flops (F/Fs) 21a through 21d, five multipliers 22a through 22e, and an adder 23. Each of the F/Fs 21a to 21d delays a signal by one sample.

The four F/Fs 21a to 21d are connected in series, and the five multipliers 21a to 22e are connected to an input terminal of the F/F 21a and (four) output terminals of the F/Fs 21a to 21d, respectively. The output terminals of the multipliers 22a to 22e are connected to the adder 23, and the output terminal of the adder 23 is connected to the switch 11b.

Therefore, a value obtained by multiplying a signal at the input terminal of the F/F 21a by a predetermined value in the multiplier 22a, a value obtained by multiplying a signal at the output terminal of the F/F 21a (i.e., a signal delayed by one sample) by a predetermined value in the multiplier 22b, a value obtained by multiplying a signal at the output terminal of the F/F 21b (i.e., a signal delayed by two samples) by a predetermined value in the multiplier 22c, a value obtained by multiplying a signal at the output terminal of the F/F 21c (i.e., a signal delayed by three samples) by a predetermined value in the multiplier 22d, and a value obtained by multiplying a signal at the output terminal of the F/F 21d (i.e., a signal delayed by four samples) by a predetermined value in the multiplier 22e are input to the adder 23 to be added therein and output to the switch 11b.

That is to say, by passing through the FIR filter 10, an interference signal and/or a noise that was not completely removed in the LPF 7 is removed from the digital received signal input from the switch 11a, and/or group delay variation or ripple characteristics caused in the LPF 7 are compensated.

The delay circuit 12 is composed of a number of F/Fs 21e and 21f connected in series as shown in FIG. 2. The number of F/Fs constituting the delay circuit 12 is determined by a delay time for a signal in the FIR filter 10. Specifically, the number of F/Fs is determined so that the delay time for a received signal input from the switch 11a to the switch 11b via the FIR filter 10 is equal to the delay time for a received signal input from the switch 11a to the switch 11b via the delay circuit 12. (Put another way, the number of F/Fs in the delay circuit 12 is determined with respect to a maximum value of the tap coefficient used in the FIR filter 10.)

Therefore, the delay circuit 12 only adjusts the delay time for a digital received signal input and does not remove an interference signal or compensate various characteristics as the FIR filter 10 does. Hence, the delay circuit 12 has a smaller circuit scale and consumes less electric power than the FIR filter 10.

The FIR filter 10 and the delay circuit 12 are both connected to the switch 11b. The switch 11b is configured as a 2-input-1-output multiplexer, for example, and outputs a received signal input from the FIR filter 10 or the delay circuit 12 to a digital modulation/demodulation circuit 15. Switching of the switch 11b is made in accordance with a switching control signal input from the switch control section 13. Switching of the switch 11a and switching of the switch 11b are performed in conjunction with each other. That is to say, when the switch 11a is switched so as to output a received signal to the FIR filter 10, the switch 11b is switched at the same time so that a received signal input from the FIR filter 10 is output to a received signal strength detection circuit (RSSI) 16 in the digital modulation/demodulation circuit 15.

The received signal input to the RSSI 16 is output to an I/F 18 via a CPU 17 after signal strength detection. The strength of the received signal detected in the RSSI 16 is output to the LNA 3, the VGA 8, and the switch control section 13. In the LNA 3 and the VGA 8, gain is controlled in accordance with the strength of the received signal input from the RSSI 16. The switch control section 13 outputs a switching control signal to the switches 11a and 11b based on the strength of the received signal input from the RSSI 16 and a predetermined threshold value Th which is input from a threshold setting section 14.

Figure 3:
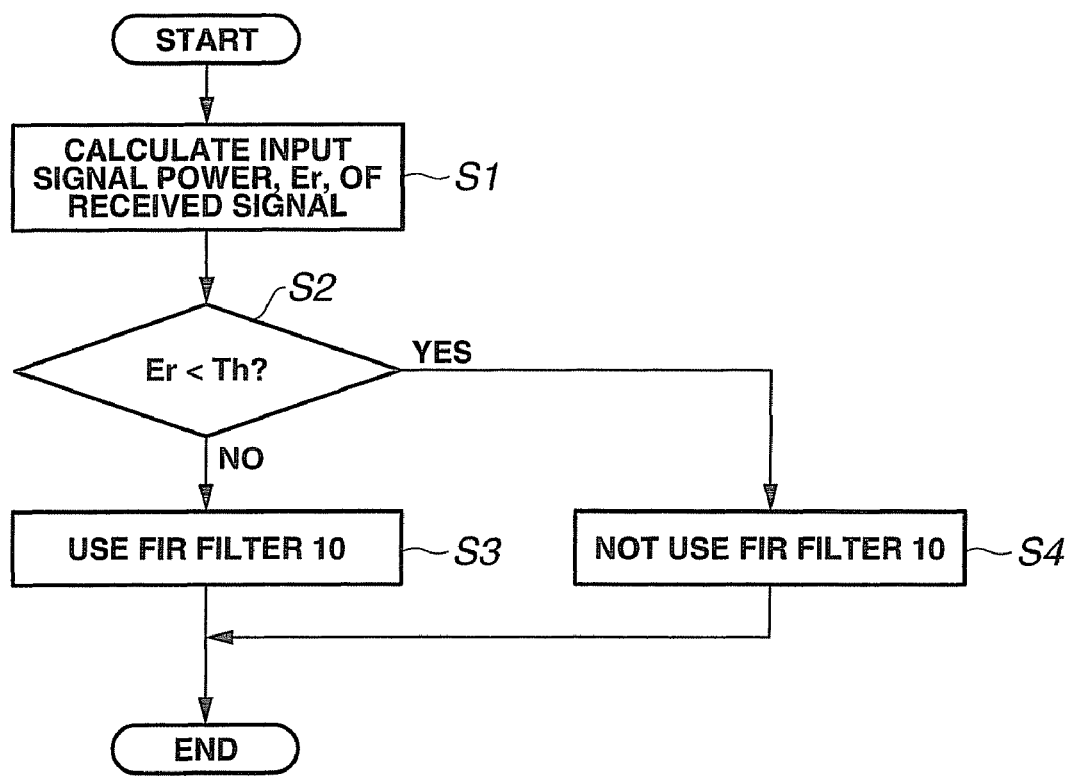
FIG. 3 is a flowchart illustrating judgment on switching of switches 11a and 11b by a switch control section 13.

Next, switching control on the switches 11a and 11b by the switch control section 13 will be described using FIG. 3. FIG. 3 is a flowchart illustrating judgment on switching of the switches 11a and 11b by the switch control section 13.

As shown in FIG. 3, first in step S1, an input signal power Er is calculated from the strength of a received signal input from the RSSI 16. Then in step S2, the input signal power Er calculated in step S1 is compared with the predetermined threshold value Th input from the threshold setting section 14. The threshold value Th is a predetermined value and may be set at the time of hardware assembly or factory shipment, for example.

If the input signal power Er of the received signal is greater than or equal to the threshold value Th in step S2, the flow proceeds to step S3, where the switches 11a and 11b are switched to the FIR filter 10 side. That is to say, when the strength of the received signal is high, an interference signal and/or a noise is removed and EVM is improved by use of the FIR filter 10.

On the other hand, if the input signal power Er of the received signal is smaller than the threshold value Th in step S2, the flow proceeds to step S4, where the switches 11a and 11b are switched to the delay circuit 12 side. In other words, when the strength of the received signal is low, power consumption is reduced by not using the FIR filter 10.

A transceiver requires reduction in EVM for utilizing high-speed data transfer capability, but whether high-speed data transfer is available or not depends on wireless communication environment. That is to say, in an area with weak received signal power, high-speed data transfer cannot be performed due to effect of characteristic degradation caused by thermal noise, which is random noise (white noise), even if the EVM of a receiver is improved (i.e., reduced). Similarly, in an area in which an interference signal such as a signal for other base station is strong, high-speed data transfer is not available either due to effect of characteristic degradation caused by the interference signal.

Accordingly, when the input power of the received signal is weak, improvement in EVM would not enable utilization of the transceiver's capability and unnecessarily increase power consumption. Thus, by using the delay circuit 12 instead of the FIR filter 10 which is used for EVM reduction as mentioned above, power consumption can be reduced without impairing the capability of the radio.

As described above, in the receiver circuit according to the first embodiment of the invention, whether to use the FIR filter 10 or not is determined by the switch control section 13 based on the strength of a received signal, and EVM characteristics can be guaranteed by using the FIR filter 10 when the signal strength is high. On the other hand, when the strength is low, power consumption can be reduced by avoiding the use of the FIR filter 10.

Figure 4:
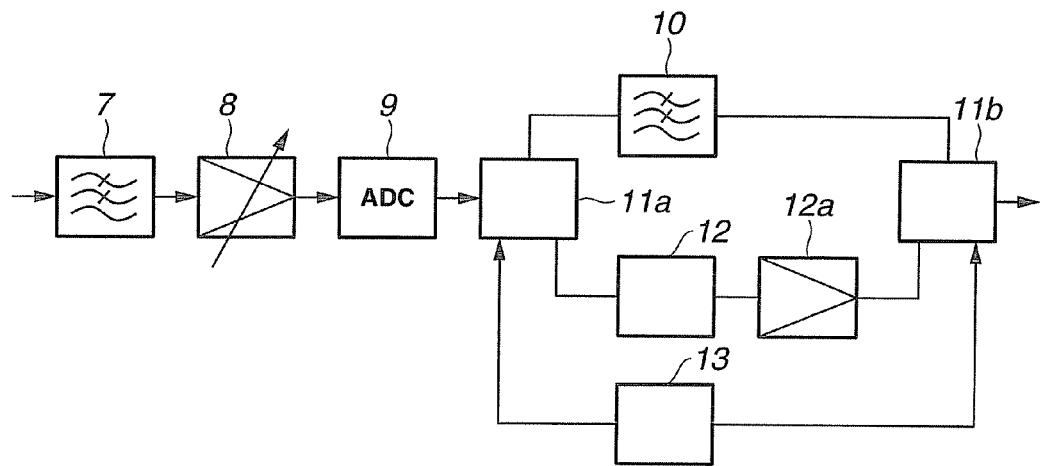
FIG. 4 is a diagram illustrating a variation of the receiver circuit according to the first embodiment of the invention.

To prevent change in gain of a received signal depending on whether the FIR filter 10 is used or the delay circuit 12 is used without using the FIR filter 10, a gain adjustment circuit 12a, which is composed of a multiplier, for example, may be inserted between the delay circuit 12 and the switch 11b as shown in FIG. 4. FIG. 4 is a diagram illustrating a variation of the receiver circuit according to the first embodiment of the invention. By inserting the gain adjustment circuit 12a, the gain of a received signal obtained when the FIR filter 10 is not used can be adjusted to the gain of a received signal for when the FIR filter 10 is used, while power consumption is reduced.

Second Embodiment

Figure 5:
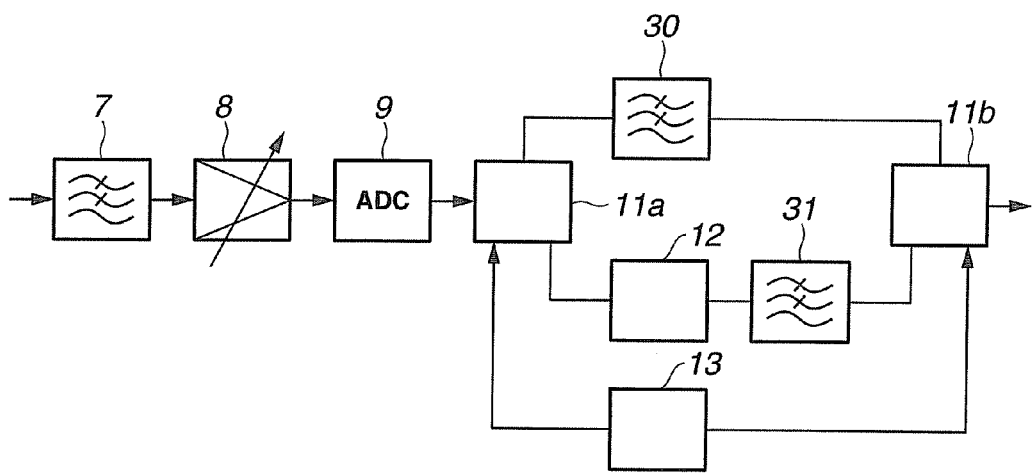
FIG. 5 is a schematic block diagram illustrating configuration of a receiver circuit according to a second embodiment of the invention.

Next, referring to FIG. 5, configuration of a receiver circuit according to a second embodiment of the invention will be described. FIG. 5 is a schematic block diagram illustrating the configuration of a receiver circuit according to the second embodiment of the invention. In FIG. 5, the same components as those of the receiver circuit according to the first embodiment are denoted with the same reference numerals and descriptions of such components are omitted.

The receiver circuit of the first embodiment shown in FIG. 1 is provided with a path that passes through the FIR filter 10 and a path that passes through the delay circuit 12 between the switches 11a and 11b. Meanwhile, the receiver circuit of the present embodiment shown in FIG. 5 is different in that the circuit has a path that passes through the FIR filter 30 having a longer tap length and a path that passes through the delay circuit 12 and the FIR filter 31 having a shorter tap length than that of the FIR filter 30. The FIR filter 30 with a longer tap length is mainly used for compensating characteristics of low-frequency ranges and the FIR filter 31 with a shorter tap length is mainly used for compensating characteristics of high-frequency ranges.

Switching control on the switches 11a and 11b is performed in a similar manner to that of the first embodiment. That is to say, when input signal power is strong or an interference signal is weak, it is necessary to reduce EVM and hence a received signal is forced to pass through the FIR filter 30 of a longer tap length. Conversely, when the input signal power is weak or an interference signal is strong, it is better to reduce power consumption than to reduce EVM, so that a received signal is forced to pass through the FIR filter 31 of a shorter tap length.

The FIR filter 30 with a longer tap length can improve EVM because the FIR filter 30 compensates a wide range of characteristics from a low frequency range to a high frequency range although it increases power consumption. On the other hand, the FIR filter 31 with a shorter tap length can effectively compensate characteristics while minimizing increase in power consumption because the FIR filter 31 compensates characteristics only in high-frequency ranges in which characteristic degradation due to an interference signal and/or a noise is easy to occur.

The FIR filters 30 and 31 have different delay times because of having different tap lengths. (Delay time is longer when the FIR filter 30 is passed through.) Therefore, as in the first embodiment, the delay circuit 12 is inserted on the path on which the FIR filter 31, which is the path with the shorter delay time, is positioned. The delay circuit 12 is configured such that the delay time for a received signal input from the switch 11a to the switch 11b via the FIR filter 30 is equal to the delay time for a received signal input to the switch 11b from the switch 11a via the delay circuit 12 and the FIR filter 31.

As described above, by selectively using the two types of FIR filters 30 and 31 which are provided with different characteristics by having different tap lengths according to whether received signal power is strong or weak and/or whether there is an interference signal or not, EVM can be effectively improved while power consumption is reduced.

The present invention is not intended to be limited to the above-described embodiments and various changes or modifications can be made without departing from the scope of the invention.

For example, while the foregoing embodiment determines whether to use the FIR filter 10 or not based on comparison between a received signal strength detected by the RSSI 16 and the predetermined threshold value Th input from the threshold setting section 14, it may be determined based on transmission power, for example. More specifically, a transmission power is determined by the switch control section 13 and if the power is greater than a predetermined threshold value, a base station of interest is far and hence the strength of a received signal is also expected to be low. Thus, the switches 11a and 11b are switched so that the FIR filter 10 is not used. On the other hand, if transmission power is smaller than the predetermined threshold value, the base station is near and the strength of a received signal is expected to be high. Thus, the switches 11a and 11b are switched so that the FIR filter 10 is used.

Alternatively, whether to use the FIR filter 10 or not may be determined according to whether the mobile communication terminal device is performing communication or not. To be specific, the switches 11a and 11b are switched so that the FIR filter 10 is used when the mobile communication terminal device is transmitting and receiving signals to and from a base station, and so that the FIR filter 10 is not used when the terminal device is not transmitting but receiving signals (i.e., when waiting for a signal in stand-by mode).

Furthermore, presence or absence of an interference signal may be detected by comparing a level of an input signal to the FIR filter 10 with a level of an output signal from the FIR filter 10, and use or nonuse of the FIR filter 10 may be switched. For example, when the input and output signal levels are substantially equal, the terminal device is estimated to be in an environment with no interference signal, thus it is determined that EVM needs to be improved, and the FIR filter 10 is used. On the other hand, if the level of the input signal is greater than the level of the output signal, the mobile terminal is estimated to be in an environment with an interference signal and hence it is determined that high-speed communication capability would not work even with reduction in EVM. Thus, the switches 11a and 11b are switched so that the FIR filter 10 is not used. As the input and output signal levels of the ADC 9 do not change in principle, presence or absence of an interference signal may be determined using the input signal level of the ADC 9 instead of the input signal level of the FIR filter 10.

Alternatively, two or more of these criteria of determination may be used in combination.

According to the above-described embodiments, increase in power consumption can be suppressed even when an analog filter and a digital filter are used in combination.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A receiver circuit, comprising:
an analog filter configured to remove an interference signal and/or a noise from a received signal;
an analog-to-digital converter configured to digitize a signal output from the analog filter;
a digital filter configured to further remove the interference signal and/or the noise from a signal output from the analog-to-digital converter and compensate imperfection in in-band characteristics caused in the analog filter;
a delay circuit configured to delay the signal output from the analog-to-digital converter by a predetermined time period; and
a control circuit configured to control a destination of the signal output from the analog-to-digital converter, wherein
the control circuit switches the destination of the signal output from the analog-to-digital converter to one of the digital filter and the delay circuit according to a predetermined condition.

2. The receiver circuit according to claim 1, wherein a second digital filter having a shorter tap length than the tap length of the digital filter is serially connected to the delay circuit.

3. The receiver circuit according to claim 1, wherein a gain adjustment circuit is serially connected to the delay circuit.

4. The receiver circuit according to claim 2, wherein a gain adjustment circuit is serially connected to the delay circuit.

5. The receiver circuit according to claim 1, wherein the control circuit switches the destination of the signal output from the analog-to-digital converter according to whether or not there is an interference signal superimposed on the received signal.

6. The receiver circuit according to claim 1, wherein the control circuit switches the destination of the signal output from the analog-to-digital converter to one of the digital filter and the delay circuit based on a signal strength calculated from the received signal.

7. The receiver circuit according to claim 6, wherein the control circuit switches the destination of the signal output from the analog-to-digital converter to the digital filter when the signal strength is greater than or equal to a predetermined threshold value, and switches the destination of the signal output from the analog-to-digital converter to the delay circuit when the signal strength is smaller than the predetermined threshold value.

8. The receiver circuit according to claim 5, wherein presence or absence of the interference signal is detected by comparing a level of a signal input to the digital filter with the level of a signal output from the digital filter.

9. A reception method, comprising:
removing an interference signal and/or a noise from a received signal by an analog filter;
digitizing a signal from which the interference signal and/or the noise has been removed;
further removing the interference signal and/or the noise from the digitized signal, and further compensation of imperfection in in-band characteristics caused in the analog filter; and
outputting the digitized signal with a delay or outputting the digitized signal with compensation of imperfection in in-band characteristics caused in the analog filter after further removal of the interference signal and/or the noise.

10. The reception method according to claim 9, wherein selection is made between outputting the digitized signal with a delay and outputting the digitized signal with compensation of imperfection in in-band characteristics caused in the analog filter after further removal of the interference signal and/or the noise, according to whether or not there is an interference signal superimposed on the received signal.

11. The reception method according to claim 9, wherein selection is made between outputting the digitized signal with a delay and outputting the digitized signal with compensation of imperfection in in-band characteristics caused in the analog filter after further removal of the interference signal and/or the noise, based on a signal strength calculated from the received signal.

12. The reception method according to claim 11, wherein when the signal strength is greater than or equal to a predetermined threshold value, the digitized signal is output with compensation of imperfection in in-band characteristics caused in the analog filter after further removal of the interference signal and/or the noise from the digitized signal, and when the signal strength is smaller than the predetermined threshold value, the digitized signal is output with a delay.

13. A communication system, comprising:
an antenna configured to receive a signal transmitted from outside;
an analog filter configured to remove an interference signal and/or a noise from the received signal;
an analog-to-digital converter configured to digitize a signal output from the analog filter;
a digital filter configured to further remove the interference signal and/or the noise from the signal output from the analog-to-digital converter and compensate imperfection in in-band characteristics caused in the analog filter;
a delay circuit configured to delay the signal output from the analog-to-digital converter by a predetermined time period;
a control circuit configured to control a destination of the signal output from the analog-to-digital converter; and
an interface configured to output the signal output from the delay circuit or from the digital filter to outside, wherein
the control circuit switches the destination of the signal output from the analog-to-digital converter to one of the digital filter and the delay circuit according to a predetermined condition.

14. The communication system according to claim 13, wherein a second digital filter having a shorter tap length than the tap length of the digital filter is serially connected to the delay circuit.

15. The communication system according to claim 13, wherein the control circuit switches the destination of the signal output from the analog-to-digital converter according to whether or not there is an interference signal superimposed on the received signal.

16. The communication system according to claim 13, wherein the control circuit switches the destination of the signal output from the analog-to-digital converter to one of the digital filter and the delay circuit based on a signal strength calculated from the received signal.

17. The communication system according to claim 16, wherein the control circuit switches the destination of the signal output from the analog-to-digital converter to the digital filter when the signal strength is greater than or equal to a predetermined threshold value, and switches the destination of the signal output from the analog-to-digital converter to the delay circuit when the signal strength is smaller than the predetermined threshold value.

18. The communication system according to claim 15, wherein presence or absence of the interference signal is detected by comparing a level of a signal input to the digital filter with the level of a signal output from the digital filter.

19. The communication system according to claim 13, further comprising:
   a transmission section configured to generate a signal to be output to outside; and
   a transmission/reception switching section configured to switch a connection target of the antenna to one of the analog filter and the transmission section, wherein the control circuit switches the destination of the signal output from the analog-to-digital converter to one of the digital filter and the delay circuit based on a transmission power calculated from a transmitted signal sent from the transmission section.

20. The communication system according to claim 13, wherein the communication system is used for a mobile communication terminal having high-speed data transfer capability such as HSDPA.

* * * * *